US008494162B2

(12) United States Patent
Young et al.

(10) Patent No.: US 8,494,162 B2
(45) Date of Patent: Jul. 23, 2013

(54) HARDCOPY DOCUMENT SECURITY

(75) Inventors: Kenneth Huang Young, Foster City, CA (US); Randy Cruz Soriano, San Leandro, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 597 days.

(21) Appl. No.: 12/752,049

(22) Filed: Mar. 31, 2010

(65) Prior Publication Data

US 2011/0243326 A1   Oct. 6, 2011

(51) Int. Cl.
*H04N 1/44* (2006.01)

(52) U.S. Cl.
USPC ............................ 380/246; 713/176; 713/179

(58) Field of Classification Search
USPC .................................. 380/246; 713/176, 179
See application file for complete search history.

(56) References Cited

U.S. PATENT DOCUMENTS

| 2003/0101233 | A1* | 5/2003 | Liou et al. .................... 709/218 |
| 2005/0034069 | A1* | 2/2005 | Carlson et al. ................ 715/530 |
| 2007/0170250 | A1* | 7/2007 | Bystrom et al. .............. 235/382 |
| 2007/0181736 | A1* | 8/2007 | Shaikh .......................... 242/559 |
| 2011/0015935 | A1* | 1/2011 | Montgomery et al. ........ 705/1.1 |

* cited by examiner

*Primary Examiner* — Samson Lemma
(74) *Attorney, Agent, or Firm* — Osha • Liang LLP

(57) ABSTRACT

A method for securing data in hardcopy documents. The method includes obtaining a page image having a private data item; generating an encrypted version of the private data item; obtaining a decoder identification (ID) value of a decoder; generating, using an encoder, a symbol having the encrypted version of the private data item and the decoder ID value; and generating a hardcopy document by recording the symbol on a physical medium, where the hardcopy document is transported to a subsystem having the decoder, and where the subsystem decrypts the encrypted version of the private data item after extracting the encrypted version of the private data item from the symbol.

27 Claims, 5 Drawing Sheets

HARDCOPY DOCUMENT SECURITY

BACKGROUND

Although data is often transmitted electronically between a source and a destination, a significant volume of important data is still transported in a hardcopy document. Accordingly, hardcopy document security is important to prevent unauthorized individuals from viewing and/or copying sensitive data in the hardcopy document.

SUMMARY

In general, in one aspect, the invention relates to a method for securing data in hardcopy documents. The method comprises: obtaining a page image comprising a private data item; generating an encrypted version of the private data item; obtaining a decoder identification (ID) value of a decoder; generating, using an encoder, a symbol comprising the encrypted version of the private data item and the decoder ID value; and generating a hardcopy document by recording the symbol on a physical medium, wherein the hardcopy document is transported to a subsystem comprising the decoder, and wherein the subsystem decrypts the encrypted version of the private data item after extracting the encrypted version of the private data item from the symbol.

In general, in one aspect, the invention relates to a computer readable storage medium storing instructions for securing data in hardcopy documents. The instructions comprise functionality to: obtain a page image comprising a private data item; generate an encrypted version of the private data item; obtain a decoder engine identification (ID) value of a decoder; generate a symbol comprising the encrypted version of the private data item and the decoder ID value; and generate a hardcopy document by recording the symbol on a physical medium, wherein the hardcopy document is transported to a subsystem comprising the decoder, and wherein the subsystem decrypts the encrypted version of the private data item after extracting the encrypted version of the private data item from the symbol.

In general, in one aspect, the invention relates to a method for securing data in hardcopy documents. The method comprises: obtaining a hardcopy document comprising a symbol; extracting, by a decoder, a decoder identification (ID) value and an encrypted version of a private data item from the symbol; decrypting, after confirming the decoder ID value corresponds to the decoder, the encrypted version of the private data item; and generating a page image comprising the private data item.

In general, in one aspect, the invention relates to a computer readable storage medium storing instructions for securing data in hardcopy documents. The instructions comprise functionality to: obtain a hardcopy document comprising a symbol; extract, by a decoder, a decoder identification (ID) value and an encrypted version of a private data item from the symbol; decrypt, after confirming the decoder ID value corresponds to the decoder, the encrypted version of the private data item; and generate a page image comprising the private data item.

In general, in one aspect, the invention relates to a system for securing data in hardcopy documents. The system comprises: an encryption engine configured with functionality to generate an encrypted version of a private data item; an encoder configured with functionality to generate a symbol comprising the encrypted version of the private data item and a decoder identification (ID) value; a printer configured with functionality to generate a hardcopy document by recording the symbol on a physical medium; a decoder configured with functionality to extract the private data item and the decoder ID value from the symbol in the hardcopy document, wherein the decoder ID value identifies the decoder; and a decryption engine configured with functionality to decrypt the encrypted private data item extracted from the symbol, wherein the decoder is further configured with functionality to generate a page image comprising the private data item.

Other aspects of the invention will be apparent from the following description and the appended claims.

DETAILED DESCRIPTION

Figure 1:
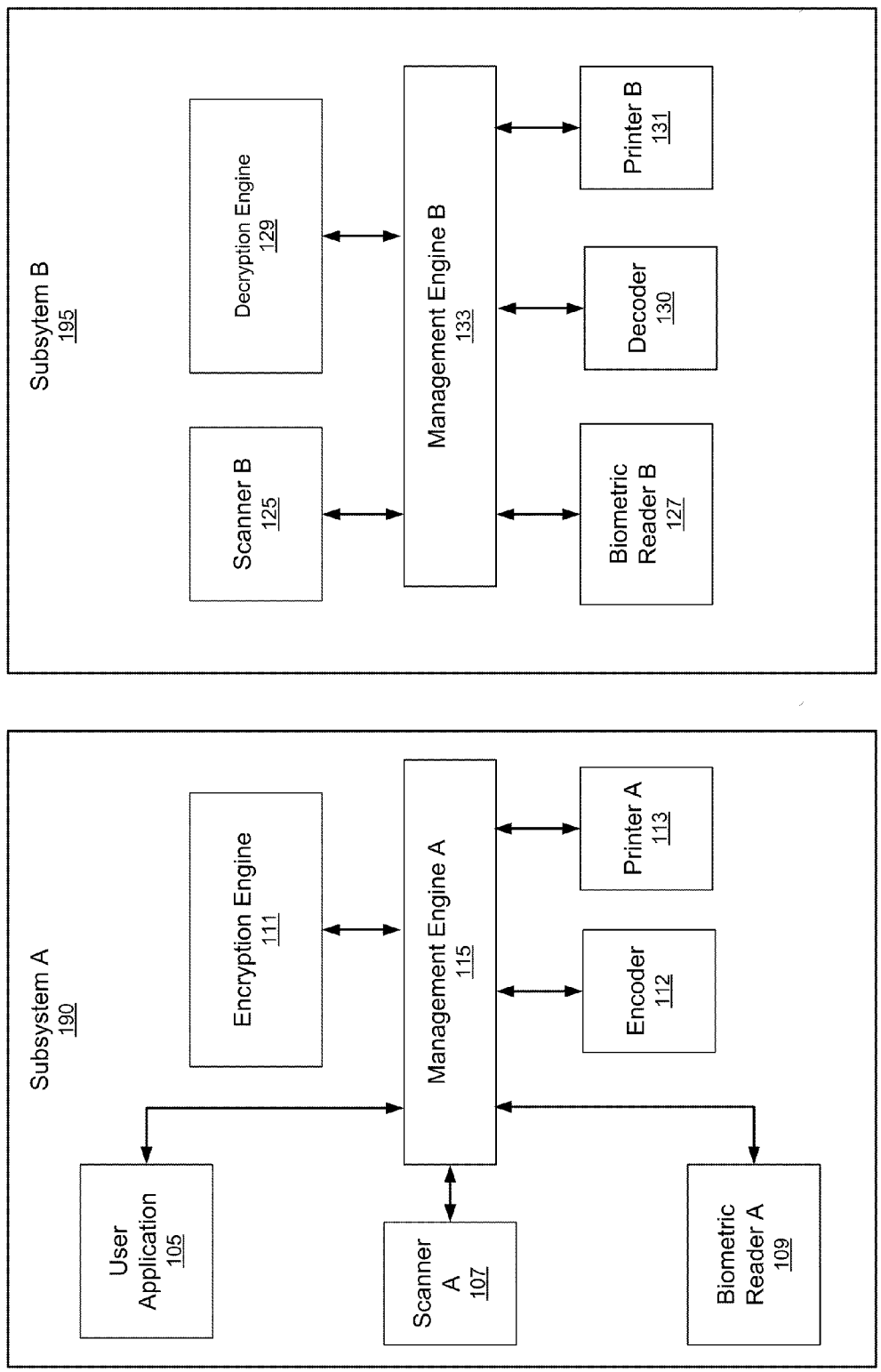
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for encrypting a private data item in a hardcopy document. A symbol comprising an encrypted version of the private data item may replace the private data item in the hardcopy document. Following transport, the encrypted private data item may be extracted from the symbol, decrypted, and used to generate a page image. The symbol may further comprise values (e.g., biometric values) to authenticate the legitimate recipient of the hardcopy document, and values to identify decoders permitted to initiate the decryption process.

FIG. 1 shows a flow diagram of a system (100) in accordance with one or more embodiments of the invention. As shown in FIG. 1, the system (100) has multiple components including a user application (105), one or more document scanners (i.e., Scanner A (107), Scanner B (125)), one or more biometric readers (i.e., Biometric Reader A (109), Biometric Reader B (127)), an encryption engine (111), one or more printers (i.e., Printer A (113), Printer B (131)), an encoder (112), a decryption engine (129), a decoder (130), and one or more management engines (i.e., Management Engine A (115), Management Engine B (133)). As also shown in FIG. 1, each component of the system (100) belongs to one of two subsystems (i.e., Subsystem A (190), Subsystem B (195)). Each of these components are described below and may be located on the same device (e.g., a server, mainframe, desktop PC, laptop, PDA, television, cable box, satellite box, kiosk, telephone, mobile phone, smart phone, etc.) or may be located on separate devices connected by a network (e.g., the Internet), with wired and/or wireless segments.

In one or more embodiments of the invention, the user application (105) is a software application operated by a user and configured to obtain, input, generate, and/or print documents. Accordingly, the user application (105) may be a word-processing application, a spreadsheet application, a desktop publishing application, a tax return preparation application, a graphics application, an Internet browser, etc. The user application (105) may generate new document pages, obtain previously saved document pages, and/or input document pages from a document scanner (e.g., Scanner A (107)). Each document page generated/obtained/inputted by the user application (105) may include one or more text blocks (e.g., a title, a subheading, a paragraph, a single sentence, a single word, a signature block, etc.) and/or one or more images (e.g., clipart, a photograph, a scanned image, etc.). A document page destined for printing may be referred to as a page image, and each text block and/or image on the page image may be referred to as a data item.

In one or more embodiment of the invention, the user tags each data item on a page image as either a private data item or a public data item. A private data item is a text block and/or image that must not appear as plaintext in a hardcopy version of the page image. In other words, a private data item includes data deemed sensitive by the user and/or data that may compromise the privacy of the user. For example, a private data item may include the user's credit card number(s) and/or social security number. In contrast, a public data item is a text block and/or image that may appear as plaintext in a hardcopy version of the page image. In other words, a public data item corresponds to non-sensitive data and/or data that is already available to the public. For example, a public data item may include the user's eye color, hair color, etc. In one or more embodiments of the invention, any data item not tagged as private may be assumed to be a public data item.

In one or more embodiments of the invention, the encryption engine (111) is configured to encrypt private data items. Accordingly, the encryption engine (111) is configured to transform a plaintext private data item into ciphertext using an encryption algorithm. In the case of multiple private data items, the encryption engine (111) may encrypt each of the private data items individually. Alternatively, the encryption engine may first concatenate the multiple private data items into a string, insert special characters between adjacent private data items within the string, and then encrypt the string.

In contrast, the decryption engine (129) is configured to decrypt encrypted private data items. In other words, the decryption engine (129) is configured to transform a ciphertext private data item into a plaintext private data item using a decryption algorithm. Those skilled in the art will appreciate the decryption algorithm is closely related to the encryption algorithm implemented by the encryption engine (111) (discussed above).

In one or more embodiments of the invention, the biometric reader A (109) is configured to obtain a recipient ID value identifying the intended recipient of a hardcopy document. As the biometric reader A (109) may correspond to a finger print scanner, an iris scanner, and/or a voice recorder/analyzer, the recipient ID value may correspond to a fingerprint, an iris scan, and/or voice patterns. Alternatively, the recipient ID value may correspond to a password provided by the intended recipient of the hardcopy document.

In one or more embodiments of the invention, the encoder (112) generates a symbol (e.g., a barcode, a data glyph) based on multiple input values. In contrast, the decoder (130) extracts multiple values based on an input symbol (e.g., a barcode, a data glyph). Accordingly, the encoder (112) and the decoder (130) operate as a pair. Further, the encoder (112) may be identified by an encoder ID value, while the decoder may be identifier by a decoder ID value. For example, the encoder ID value and the decoder ID value may correspond to the serial numbers or the internet protocol (IP) addresses of the encoder and decoder, respectively. In one or more embodiments of the invention, no two decoders have the same decoder ID value, while no two encoders have the same encoder ID value.

In one or more embodiments of the invention, a copy count restricts reproduction of a page image by the intended recipient. Accordingly, the copy count may be a whole number and a copy count of N implies the intended recipient is entitled to print/copy the page image N times. A copy count of zero implies the intended recipient is entitled to view the page image, but not copy/print the page image.

In one or more embodiments of the invention, a document ID value is generated by the encoder (112) for every page image, and corresponds to a unique identifier for the page image. For example, the document ID value may be a concatenation of the encoder ID value and a timestamp.

In one or more embodiments of the invention, the encoder (112) is configured to generate a symbol based on an encrypted version of a private data item, a decoder ID value, a recipient ID value, a copy count, and a document ID value. In contrast, the decoder (130) is configured to extract the encrypted version of the private data item, the decoder ID value, the recipient ID value, the copy count, and the document ID value from the symbol. Moreover, the decoder (130) may be configured to run conditional tests on the extracted values and initiate decryption of the encrypted private data item.

In one or more embodiments of the invention, generation of a symbol is further based on a public data item in the page image. Accordingly, the public data item may be extracted from the symbol. In one or more embodiments of the invention, multiple decoders (not shown) are permitted to initiate decryption of the encrypted private data item. In such embodiments, generation of the symbol is further based on the decoder ID values of the multiple decoders. Accordingly, the multiple decoder IDs may be extracted from the symbol.

In one or more embodiments of the invention, the encoder (112) is configured to replace a private data item in a page image with the symbol based on the encrypted version of the private data item. In other words, the encoder is configured to add/insert a symbol into a page image (discussed below). In contrast, a decoder (130) is configured to generate page images by replacing a symbol with a private data item when one or more conditions are satisfied (discussed below).

In one or more embodiments of the invention, the decoder (130) may obtain one or more symbols and public data items from a hardcopy document using the document scanner B (125). In one or more embodiments of the invention, the decoder (130) confirms it is permitted to initiate decryption of the encrypted private data item by extracting, from the symbol, at least one decoder ID value corresponding to the decoder (130). In one or more embodiments of the invention, the decoder (130) confirms the individual requesting decryption of a hardcopy document is the intended recipient by extracting a recipient ID value from the symbol and matching the recipient ID value with biometric data of the individual (e.g., obtained by Biometric Reader B (127)).

In one or more embodiments of the invention, the printer A (113) generates a hardcopy document by recording the page image, including symbols added to the page image by the encoder (112), on a physical medium (e.g., paper, microfilm, microfiche, etc.). Thus, the printer may be an inkjet printer, a laser printer, a microfilmer (i.e., microfilm imager), etc.

In one or more embodiments of the invention, the printer B (131) reproduces, on a physical medium (e.g., paper), a page image generated by the decoder (130). In one or more embodiment of the invention, the decoder (130) controls the number of reproductions by recording the extracted copy count with the extracted document ID value as an n-tuple. Following a reproduction of the generated page image on a physical medium, the copy count in the n-tuple is decremented. When the copy count reaches zero, the decoder (130) may disable print/copy functionality of the printer B (131). In other words, the page image may only be viewed and not printed when the copy count is zero.

In one or more embodiments of the invention, the management engine A (115) provides a link between the user application (105), the scanner A (107), the biometric reader A (109), the encryption engine (111), the encoder (112), and the printer A (113). The management engine A (115) may be configured to convert data or commands/messages from one format to another format in order to render the components (105, 107, 109, 111, 112, 113) compatible with each other. In one or more embodiments of the invention, the management engine A (115) includes a GUI (not shown) for viewing one or more of the inputs and outputs of the components (105, 107, 109, 111, 112, 113).

In one or more embodiments of the invention, the management engine B (133) provides a link between the scanner B (125), the biometric reader B (127), the decryption engine (129), the decoder (130), and the printer B (131). The management engine B (133) may be configured to convert data or commands/messages from one format to another format in order to render the components (125, 127, 129, 130, 131) compatible with each other. In one or more embodiments of the invention, the management engine B (133) includes a GUI (not shown) for viewing one or more of the inputs and outputs of the components (125, 127, 129, 130, 131).

As shown in FIG. 1, the components of system (100) belong to either the subsystem A (190) or the subsystem B (195). In one or more embodiments of the invention, the subsystem A (190) and the subsystem B (195) are geographically separate. In other words, the subsystem A (190) and the subsystem B (195) may be located, for example, on different floors of the same building, in different buildings within the same city, in different cities, in different counties, in different countries, etc. Accordingly, any hardcopy document generated by the subsystem A (190) may be transported to the subsystem B (195) by an individual, a postal authority, and/or a courier service using a variety of transportation means (e.g., bicycle, automobile, train, ship, airplane, etc.). In one or more embodiments of the invention, the individual transporting the hardcopy document is the intended recipient of the hardcopy document. In one or more embodiments of the invention, the individual operating the decoder (130) is the intended recipient of the hardcopy document. In one or more embodiments of the invention, an authorized individual may operate the decoder (130) on behalf of the intended recipient of the hardcopy document.

Figure 2:
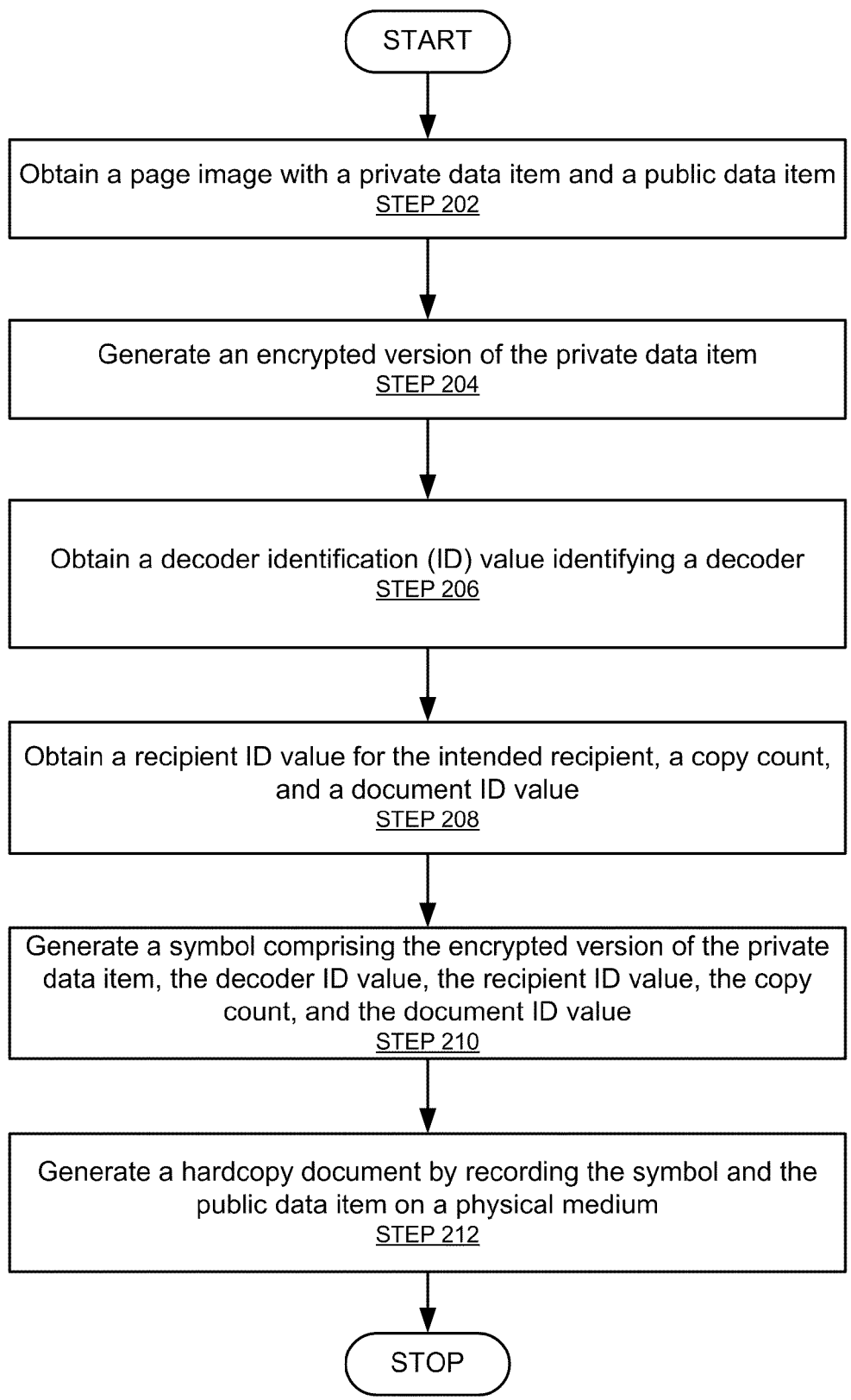
FIG. 2 shows a flowchart in accordance with one or more embodiments of the invention.

FIG. 2 shows a flowchart in accordance with one or more embodiments of the invention. The process depicted in FIG. 2 may be implemented using the system (100), described above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a page image for conversion to a hardcopy document is obtained (STEP 202). The page image may be obtained from a user application (e.g., a word processing application) or from a scanner operated by a user. Moreover, the page image may include a public data item and/or a private data item. As discussed above, a private data item is a data item with sensitive or private data that should not be in plaintext in the hardcopy document. In contrast, a public data item is a data item having only non-sensitive data and/or only data that is already publically available. One or more data items within the page image may be identified as private data items based on tags set by a user. Similarly, one or more data items within the page image may be identified as public data items based on tags set by the user.

In STEP 204, an encrypted version of the private data item is generated. As discussed above, in order to generate the encrypted version, the plaintext of the private data item is transformed into ciphertext by an encryption algorithm.

In STEP 206, a decoder ID value is obtained. The decoder ID value identifies a decoder permitted to initiate decryption of the encrypted private data item. As discussed above, the decoder ID value is a unique identifier corresponding to a decoder. For example, the decoder ID value may be a serial number and/or an IP address of the decoder. In one or more embodiments of the invention, the decoder permitted to decrypt the encrypted private data item is selected/specified by the user and may be based on a destination of the hardcopy document.

In STEP 208, a recipient ID value, a copy count, and a document ID value are obtained. The recipient ID value may be a password known to the intended recipient of the hardcopy document and/or may be biometric data (e.g., voice patterns, iris scans, fingerprint, DNA sequence, etc.) of the intended recipient of the hardcopy document. As discussed above, the copy count is a whole number parameter specifying the number of copies and/or the number of times the hardcopy document can be printed/reproduced following decryption. In one or more embodiments of the invention, the copy count is specified by a user. The document ID value is a unique value generated by an encoder (discussed below) having an encoder ID value (e.g., a serial number, an IP address, etc.). In one or more embodiments of the invention, the document ID value is a concatenation of the encoder engine ID value with a timestamp (e.g., the time when the request to convert the page image to a hardcopy document is received from a user).

In STEP 210, a symbol is generated based on the encrypted version of the private data item, the decoder ID value, the recipient ID value, the copy count, and the document ID value. As discussed above, the symbol may be a barcode or a data glyph. As discussed above, the symbol may be generated by an encoder. Moreover, the encrypted version of the private data item, the decoder ID value, the recipient ID value, the copy count, and the document ID value may be extracted from the symbol by a decoder at a future time.

In STEP 212, the private data item is replaced with the symbol within the page image. Further, a hardcopy document may be generated by recording the page image (i.e., the symbol and the public data item) on a physical medium (e.g., paper, microfiche, etc.). In one or more embodiments of the invention, following generation of the hardcopy document, the hardcopy document is transported (e.g., by a shipping authority) to a decoder. The decoder may extract the encrypted private data item from the symbol, and initiate decryption of the encrypted private data item to generate a page image with plaintext.

Figure 3:
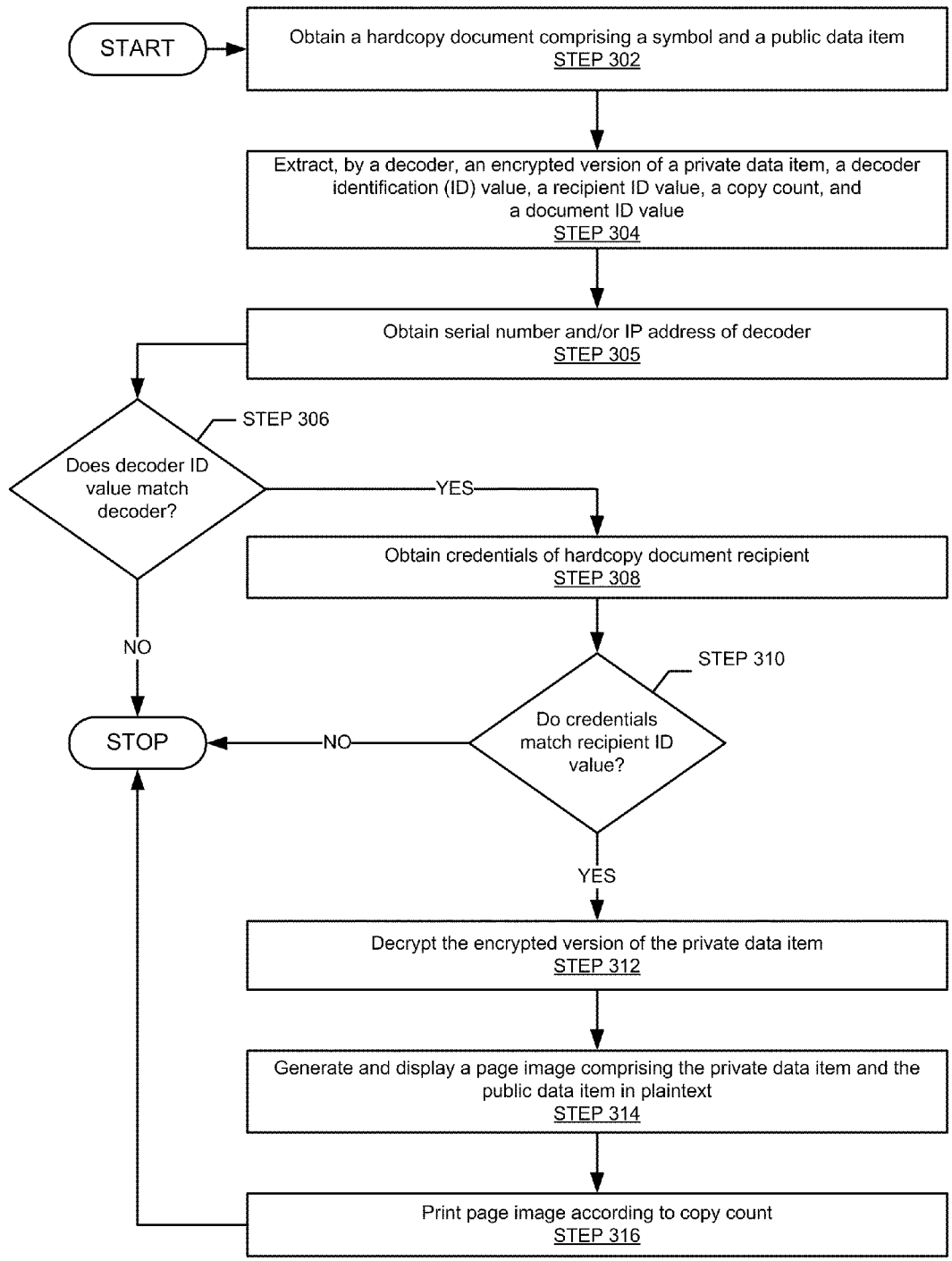
FIG. 3 shows a flowchart in accordance with one or more embodiments of the invention.

FIG. 3 shows a flowchart in accordance with one or more embodiments of the invention. The process depicted in FIG. 3 may be implemented using the system (100), described above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, a decoder obtains an electronic version of a hardcopy document (STEP 302). The electronic version may be obtained by scanning and/or digitally photographing the hardcopy document. As discussed above, the hardcopy document may have a symbol (e.g., a barcode, a data glyph, etc.) and a public data item in plaintext.

In STEP 304, the decoder extracts, from the symbol, an encrypted version of a private data value, one or more decoder ID values, a recipient ID value, a copy count, and a document ID value. As discussed above, the one or more decoder ID values identify decoders permitted to initiate decryption of the encrypted private data item. As also discussed above, the recipient ID value identifies the intended recipient of the hardcopy document.

In STEP 305, the serial number and/or the IP address of the decoder is obtained. As discussed above, the serial number and/or the IP address of the decoder uniquely identifies the decoder. In one or more embodiments of the invention, the serial number and/or the IP address of the decoder is a hard-wired value within the decoder. Alternatively, the serial number and/or the IP address is stored within a memory of the decoder.

In STEP 306, it is determined whether at least one of the decoder ID values corresponds to the decoder. In other words, it is determined whether (i) the serial number of the decoder matches the serial number extracted from the symbol; and/or (ii) the IP address of the decoder matches at least one IP address in the range of IP address extracted from the symbol. When it is determined that none of the decoder ID values extracted from the symbol correspond to the decoder, the process ends (i.e., the decoder does not have permission to initiate decryption of the encrypted private data item). However, when it is determined that at least one of the decoder ID values extracted from the symbol corresponds to the mentioned decoder, the process proceeds to STEP 308 (i.e., the decoder is validated).

In STEP 308, one or more credentials are obtained from the present recipient of the hardcopy document. In one or more embodiments of the invention, the credentials correspond to a password. Accordingly, the credentials may be obtained using a user interface (e.g., keypad, touchscreen, etc.) of the decoder accessed by the present recipient of the hardcopy document. In one or more embodiments of the invention, the credentials correspond to biometric data (e.g., voice patterns, iris scans, fingerprints, etc.). Accordingly, the credentials may be obtained from a voice analyzer, fingerprint scanner, iris scanner, or any other type of biometric scanner (e.g., Biometric Reader B (127)) accessed by the present recipient of the hardcopy document.

In STEP 310, it is determined whether the present recipient of the hardcopy document is the intended recipient of the hardcopy document by comparing the credentials with the recipient ID value extracted from the symbol. When it is determined that the present recipient of the hardcopy document is not the intended recipient (i.e., there is not a match between the recipient ID value and the credentials), the process ends. However, when it is determined that the present recipient of the hardcopy document is the indented recipient, the process proceeds to STEP 312.

In STEP 312, the encrypted version of the private data item is decrypted. As discussed above, the decryption may be executed by a decryption engine (i.e., decryption engine (129)). It is during the decryption process that the extracted ciphertext private data item is transformed into plaintext by a decryption algorithm.

In STEP 314, a page image is generated having the plaintext private data item and the public data item. In one or more embodiments of the invention, the page image of STEP 314 is essentially the same as the electronic version of the hardcopy document except that the symbol is replaced with the plaintext private data item.

In STEP 316, the page image of STEP 314 may be printed according to the copy count. In other words, the copy count specifies the number of times the page image may be printed. As discussed above, the extracted document ID value and the extracted copy count may be stored in an n-tuple. Each time the page image is printed, the copy count is decremented. In one or more embodiments of the invention, when the copy count is zero, the page image can only be displayed but not printed.

Figure 4:
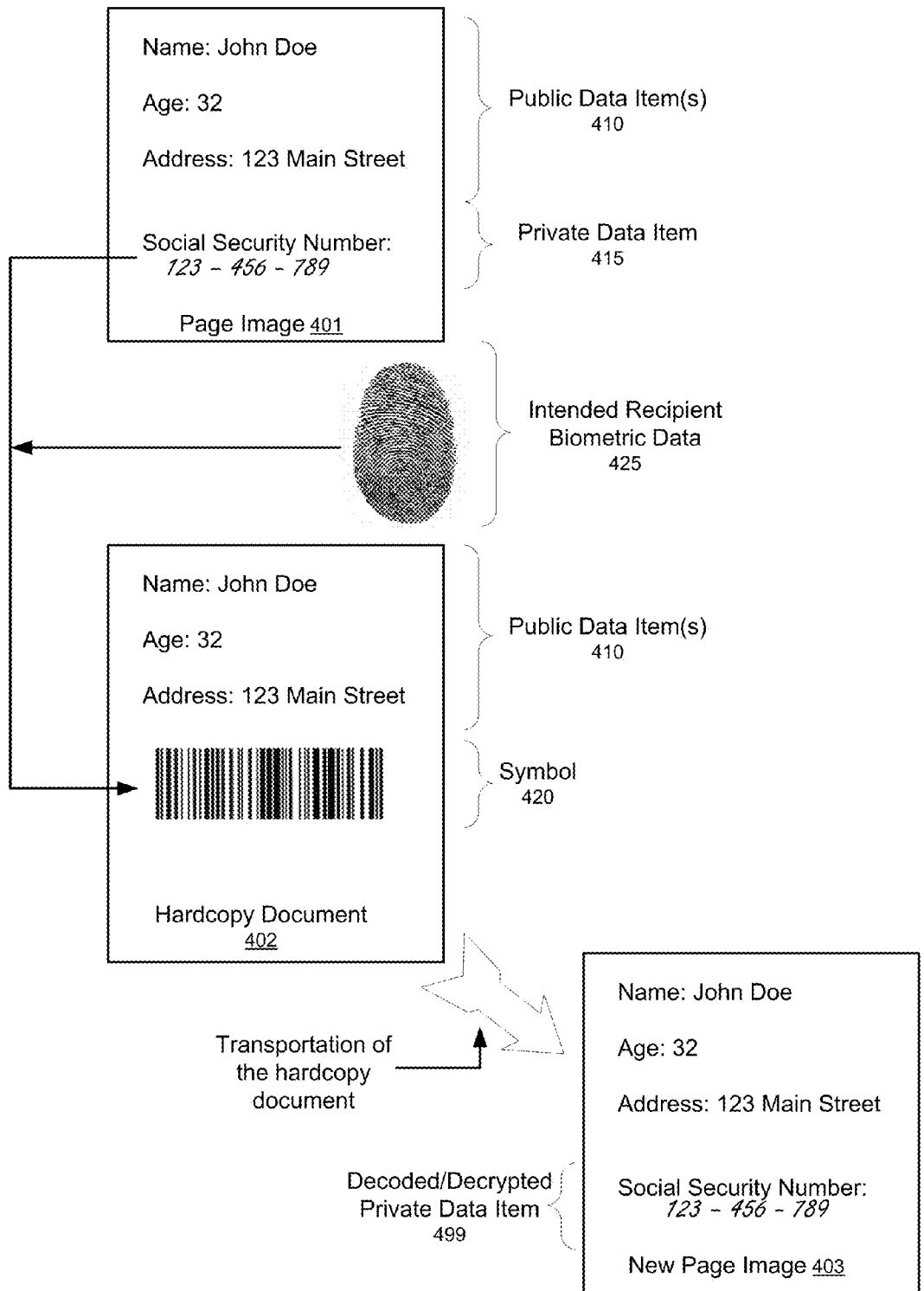
FIG. 4 shows a flow diagram of an example in accordance with one or more embodiments of the invention.

FIG. 4 shows a flow diagram of an example in accordance with one or more embodiments of the invention. As shown in FIG. 4, a page image (401) includes one or more public data items (410) and a private data item (415). Specifically, the private data item (415) is a handwritten social security number. In other words, the private data item (415) is an image.

As also shown in FIG. 4, a hardcopy document (402) based on the page image (401) includes the public data items (410) and a symbol (420) (i.e., a barcode) replacing the private data item (415). The symbol comprises an encrypted version of the private data item (415). The symbol further comprises biometric data (425) (i.e., a fingerprint) of the intended recipient of the hardcopy document (402).

Following transportation of the hardcopy document (402), a new page image (403) is generated based on the hardcopy document (402). Specifically, the new page image (403) comprises the public data items (410) of the hardcopy document (402). However, the symbol (420) in the hardcopy document (402) is not present in the new page image (403). Instead, the encrypted private data item (415) has been extracted from the symbol (420) and decrypted. Accordingly, the page image (403) includes the decoded/decrypted private data item (499) instead of the symbol (420). The biometric data (425) has also been extracted from the symbol (420). Before decryption of the encrypted private data item is executed, the extracted biometric data (425) must match the biometric data of the individual requesting the decryption.

One or more embodiments of the invention have the following advantages: the ability to encrypt data in a hardcopy document, the ability to restrict the number of times a page image is printed, the ability to authenticate the intended recipient of a hardcopy document using data within the hardcopy document, the ability to specify decoders having permission to initiate the decryption process within the hardcopy document, and the ability to encrypt only part of a hardcopy document. Other embodiments of the invention may have additional advantages.

Figure 5:
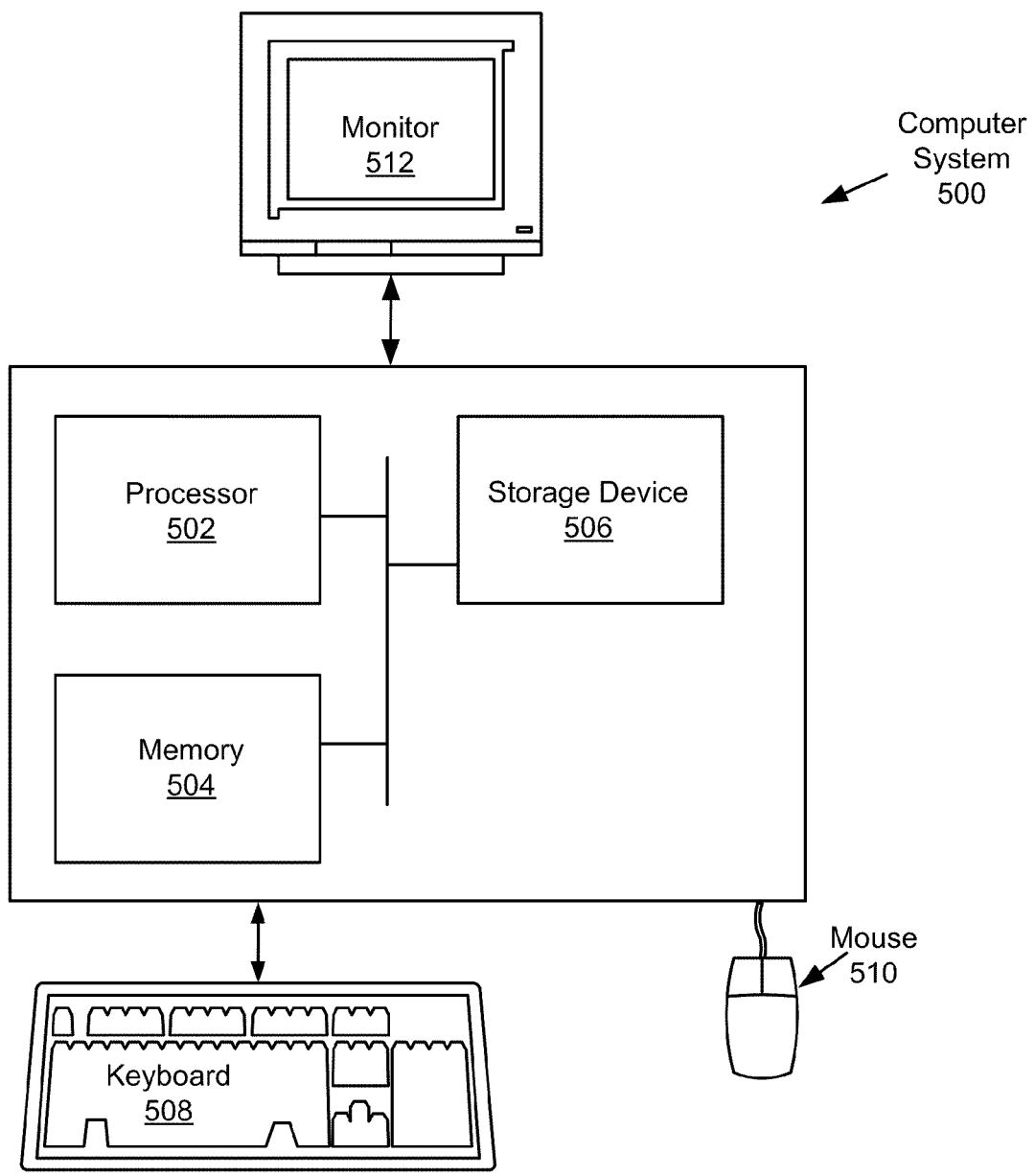
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., decoder (130), encoder (112), encryption engine (111), decryption engine (129), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for securing data in hardcopy documents, comprising:
    obtaining a page image comprising a private data item, wherein the private data item is visible and unencrypted in the page image;
    generating an encrypted version of the private data item;
    obtaining a decoder identification (ID) value of a decoder;
    generating, using an encoder comprising a computer processor, a symbol comprising the encrypted version of the private data item and the decoder ID value; and
    generating a hardcopy document from the page image by recording the symbol instead of the private data item on a physical medium,
    wherein the symbol replaces the private data item in the hardcopy document,
    wherein the hardcopy document is transported to a subsystem comprising the decoder, and
    wherein the subsystem decrypts the encrypted version of the private data item after extracting the encrypted version of the private data item from the symbol.

2. The method of claim 1, wherein the page image further comprises a public data item, and wherein the public data item is recorded on the physical medium in plaintext.

3. The method of claim 1, wherein the page image further comprises a public data item, and wherein the symbol further comprises the public data item.

4. The method of claim 1, wherein the symbol is a barcode.

5. The method of claim 1, wherein the symbol is a data glyph.

6. The method of claim 1, wherein the decoder ID value is a serial number of the decoder engine.

7. The method of claim 1, wherein the decoder ID value is an internet protocol (IP) address of the decoder.

8. The method of claim 1, further comprising:
    obtaining a recipient ID value corresponding to a recipient of the hardcopy document, wherein the symbol further comprises the recipient ID value.

9. The method of claim 8, wherein the recipient ID value is biometric data of the recipient.

10. The method of claim 1, further comprising:
    generating a document ID value based on an encoder ID value of the encoder and a timestamp, wherein the symbol further comprises the document ID value.

11. The method of claim 1, further comprising:
    obtaining a copy count restricting duplication of the page image by the subsystem, wherein the symbol further comprises the copy count.

12. The method of claim 1, wherein the physical medium is microfiche.

13. The method of claim 1, wherein the physical medium is paper.

14. A non-transitory computer readable storage medium storing instructions for securing data in hardcopy documents, the instructions comprising functionality to:
    obtain a page image comprising a private data item, wherein the private data item is visible and unencrypted in the page image;
    generate an encrypted version of the private data item;
    obtain a decoder engine identification (ID) value of a decoder;
    generate a symbol comprising the encrypted version of the private data item and the decoder ID value; and
    generate a hardcopy document from the page image by recording the symbol instead of the private data item on a physical medium,
    wherein the symbol replaces the private data item in the hardcopy document,
    wherein the hardcopy document is transported to a subsystem comprising the decoder, and
    wherein the subsystem decrypts the encrypted version of the private data item after extracting the encrypted version of the private data item from the symbol.

15. A method for securing data in hardcopy documents, comprising:
    obtaining a hardcopy document comprising a symbol, wherein the hardcopy document is generated from a page image comprising a private data item;
    extracting, by a decoder comprising a computer processor, a decoder identification (ID) value and an encrypted version of the private data item from the symbol, wherein the symbol replaces the private data item in the hardcopy document;
    decrypting, after confirming the decoder ID value corresponds to the decoder, the encrypted version of the private data item; and
    generating the page image comprising the private data item.

16. The method of claim 15, wherein the symbol is a barcode.

17. The method of claim 15, wherein the symbol is a data glyph.

18. The method of claim 15, wherein the hardcopy document further comprises a public data item in plaintext, and wherein the page image comprises the public data item in plaintext.

19. The method of claim 15, further comprising:
obtaining biometric data corresponding to a recipient of the hardcopy document;
extracting a recipient ID value from the symbol; and
confirming the biometric data matches the recipient ID value before decrypting the encrypted version of the private data item.

20. The method of claim 15, further comprising:
extracting, by the decoder, a copy count and a document ID from the symbol;
printing the page image;
decrementing the copy count in response to printing the page image; and
disabling a print feature of the decoder after decrementing the copy count, wherein the copy count equals zero after decrementing the copy count.

21. A non-transitory computer readable storage medium storing instructions for securing data in hardcopy documents, the instructions comprising functionality to:
obtain a hardcopy document comprising a symbol, wherein the hardcopy document is generated from a page image comprising a private data item;
extract, by a decoder, a decoder identification (ID) value and an encrypted version of the private data item from the symbol,
wherein the symbol replaces the private data item in the hardcopy document;
decrypt, after confirming the decoder ID value corresponds to the decoder, the encrypted version of the private data item; and
generate the page image comprising the private data item.

22. A system for securing data in hardcopy documents comprising:
an encryption engine configured with functionality to generate an encrypted version of a private data item in a page image, wherein the private data item is visible and unencrypted in the page image;
an encoder configured with functionality to generate a symbol comprising the encrypted version of the private data item and a decoder identification (ID) value;
a printer configured with functionality to generate a hardcopy document from the page image by recording the symbol instead of the private data item on a physical medium, wherein the symbol replaces the private data item in the hardcopy document;
a decoder configured with functionality to extract the private data item and the decoder ID value from the symbol in the hardcopy document, wherein the decoder ID value identifies the decoder; and
a decryption engine configured with functionality to decrypt the encrypted private data item extracted from the symbol,
wherein the decoder is further configured with functionality to generate the page image comprising the private data item.

23. The system of claim 22, wherein the hardcopy document comprises a public data item in plaintext, and wherein the page image comprises the public data item in plaintext.

24. The system of claim 22, wherein the symbol is a barcode.

25. The system of claim 22, wherein the symbol is a data glyph.

26. The system of claim 22, wherein the physical medium is microfiche.

27. The system of claim 22, further comprising:
a biometric reader operatively connected to the decoder and configured with functionality to obtain biometric data from a recipient of the hardcopy document,
wherein the decoder is further configured with functionality to match the biometric data with a recipient ID value extracted from the symbol in the hardcopy document.

* * * * *